(No Model.)
I. CULVER.
VAPOR BURNER.
No. 534,202. Patented Feb. 12, 1895.
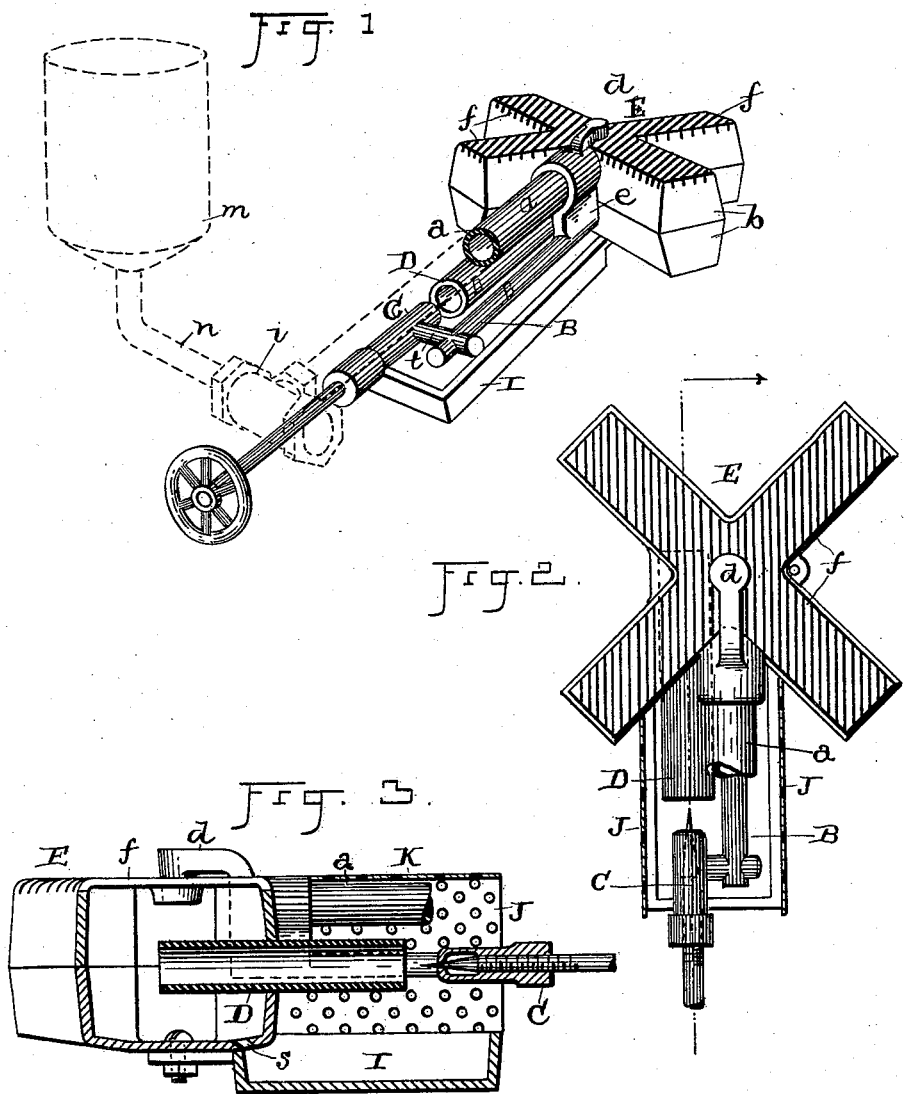
ATTEST.
Geo. E. Fuchs
James W. Berard
INVENTOR.
Ira Culver,
BY
Lehmann Pattison & Nesbit
ATTORNEYS.
THE NORRIS PETERS CO., PHOTO-LITHO., WASHINGTON, D. C.

UNITED STATES PATENT OFFICE.

IRA CULVER, OF CLEVELAND, OHIO.

VAPOR-BURNER.

SPECIFICATION forming part of Letters Patent No. 534,202, dated February 12, 1895.

Application filed August 30, 1894. Serial No. 521,724. (No model.)

*To all whom it may concern:*

Be it known that I, IRA CULVER, of Cleveland, in the county of Cuyahoga and State of Ohio, have invented certain new and useful Improvements in Vapor-Burners; and I do hereby declare the following to be a full, clear, and exact description of the invention, such as will enable others skilled in the art to which it pertains to make and use it, reference being had to the accompanying drawings, which form part of this specification.

My invention relates to improvements in vapor burners. The primary object of the same is to provide a burner consisting of radiating arms, and connecting to the center thereof between the said arms a generating feed tube and a super-heating retort which are substantially parallel and are heated after the burner is started by the flame from the arms of the burner at opposite sides thereof.

Another object of my invention is to provide substantially parallel feed generating and super-heating retort tubes, beneath which is placed a drip cup for starting purposes, and extending around the top and sides of said tubes a suitable perforated cover for retaining the heat when starting the burner.

Another object of my invention is to provide a burner having radiating arms, and connecting with the center thereof a substantially parallel feed generating tube, retort super-heating and mixing tubes, and providing a sub-flame beneath the said parallel tubes for heating the same, all of which will be more fully described hereinafter.

In the accompanying drawings:—Figure 1 is a perspective view of the burner embodying my invention, the feed generating tube being shown partially in dotted lines and the perforated cover and side for the drip pan omitted. Fig. 2 is a top view of the same, the perforated drip pan cover being removed. Fig. 3 is a vertical longitudinal sectional view taken on the dotted line Fig. 2 looking in the direction indicated by arrow.

Referring to the drawings, A indicates a burner consisting of radiating arms, preferably four in number, the said arms being preferably of the form shown in end view in Fig. 1, the upper portion of the side walls diverging and their tops provided with a series of parallel slits through which the vapor escapes for consumption. By providing the arms with parallel slits as here shown, I avoid the necessity of using the ordinary spreaders, and by making the burner of the form here shown accomplish a complete consumption of all of the escaping vapor owing to supplying fresh air between the arms and the flames produced thereby, thus supplying sufficient carbon for a complete burning of all of the vapor and preventing any unconsumed vapor from escaping and causing the usual unpleasant odor from the ordinary round burner.

The feed and generating tube $a$ extends between two of the arms of the burner and to the center thereof as shown, and has its inner end extending through the side wall of the burner as shown clearly in Fig. 3. Owing to this construction a uniform supply of vapor is furnished to all of the radiating arms from a common central point as will be readily understood.

A web $e$ extends downward from the inner end of the feed tube $a$, and extending outward from this web $e$ parallel to the feed tube $a$ is a super-heating or return tube $b$ connected at its outer end by a cross tube $d$ with the needle valve C. In a line with the end of feed valve C is the mixing tube D which extends parallel with and beneath the feed tube $a$, the inner end of the said mixing tube extending into the interior of the burner as shown in Fig. 3.

By extending the feed and generating tube $a$, the return or super-heating tube $b$ and the mixing tube D between the arms of the burner and in a plane substantially parallel with the flame of the burner, I provide a flame at either side of the said tubes whereby they are kept highly heated and a thorough generation and super-heating of the vapor accomplished whereby a superior flame is produced.

A drip pan I has its inner end secured to the under side of the burner and extends outward under the said tubes, and is provided with the side walls J and cover K both of which are preferably perforated. When starting the burner, a suitable quantity of liquid is dropped from the needle valve into the pan and lighted for heating the parallel tubes above the pan and surrounded by the side and top walls J and K, thus enabling a quick and thorough generation of vapor to be produced.

Beneath the parallel tubes and just at the inner end of the drip pan I is an aperture S made within the wall of the burner which aperture provides a sub-flame after the burner is started for keeping the parallel tubes thoroughly heated within the side and top walls J, and K, as will be readily understood.

Connected to the outer end of the tube $a$ is a joint $i$, and also connected with this joint $i$ is a pipe $m$ having its opposite end connected with a reservoir $n$. This joint $i$ is preferably formed with an ordinary cut-off valve so that when the reservoir $n$ is turned up the supply of liquid is cut off and the flame extinguished before the reservoir can be filled. Extending inward from the socket at the upper end of the web $e$ is a lug $c$ which fits in an opening made in the upper end of the burner at the center thereof, which assists in securing the tubes to the burner as will be clearly understood from the drawings.

By arranging the feed tube, the return or super-heating tube and the mixing tube altogether and extending parallel with each other, I am enabled to more completely and more thoroughly heat the tubes for starting the burner, and to keep them at a greater heat after the burner is started by means of a sub-flame directly under the said tubes; also by providing a return or super-heating tube B, I am enabled to heat the vapor to a greater degree than is possible where a return or super-heating tube is not provided, and especially when the said tube is so assembled in relation to the other tubes as to be heated by the sub-flame, and also by the flame from the arms of the burner at opposite sides thereof.

Having thus fully described my invention, what I claim as new, and desire to secure by Letters Patent, is—

The combination with a vapor burner having radiating arms, of a feed tube and a mixing tube extending in a plane parallel with and between the top and bottom of the arms of said burner, and connected with its side at a point between the said arms, whereby the mixing and feed tubes are heated by lateral radiation from the flame of the arms at each side thereof, substantially as specified.

In testimony whereof I affix my signature in presence of two witnesses.

IRA CULVER.

Witnesses:
FRED. H. NOTHNAGEL,
GEO. H. BOUTALL.